Nov. 28, 1944.  A. H. LAMB  2,363,796
ENCASED ELECTRICAL DEVICE
Filed Sept. 5, 1941
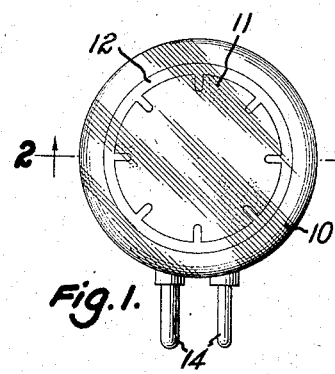
Fig. 1.
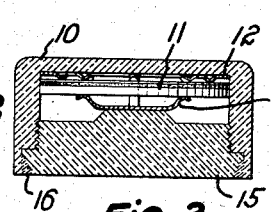
Fig. 2.
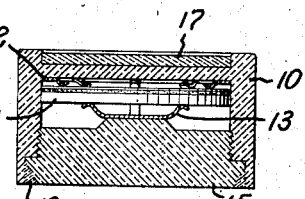
Fig. 3.
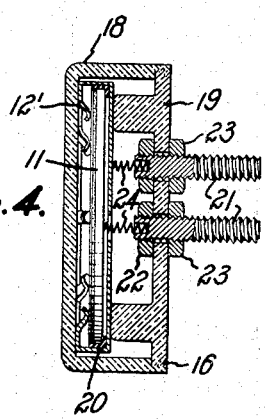
Fig. 4.
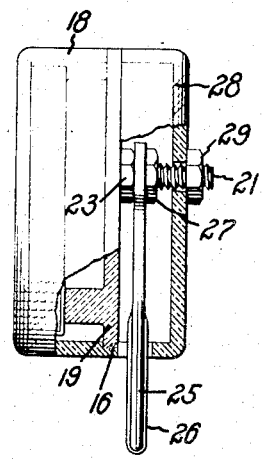
Fig. 5.
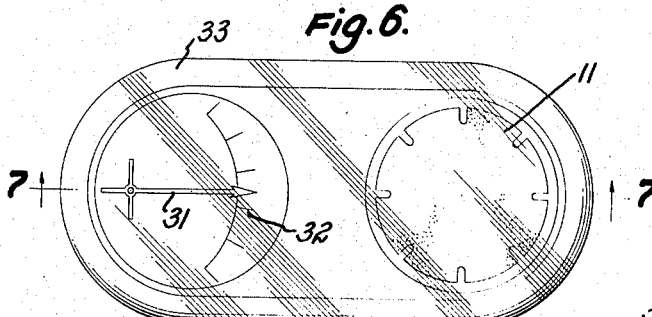
Fig. 6.
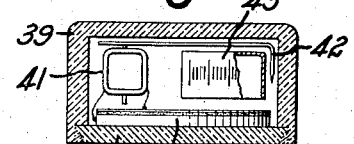
Fig. 9.
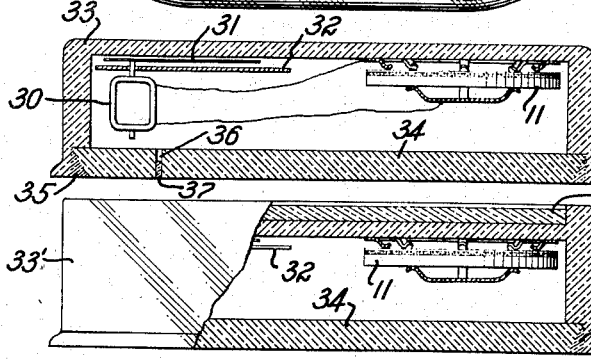
Fig. 7.
Fig. 8.
Inventor:
Anthony H. Lamb,
by Pierce & Scheffler,
Attorneys.

Patented Nov. 28, 1944

2,363,796

UNITED STATES PATENT OFFICE 2,363,796

ENCASED ELECTRICAL DEVICE

Anthony H. Lamb, Elizabeth, N. J., assignor to Weston Electrical Instrument Corporation, Newark, N. J., a corporation of New Jersey Application September 5, 1941, Serial No. 409,752

1 Claim. (Cl. 88—23)

This invention relates to encased electrical devices, and more particularly to electrical devices hermetically sealed within cases which protect the devices against attack by deleterious media present in the atmosphere.

Various component members of electrical devices are critically affected by dust, fumes, moisture and the like. The movable coils of sensitive electrical instruments and the light sensitive material of photoelectric cells are especially subject to attack by such atmospheric media. To protect these members against gradual deterioration, loss of efficiency and eventual, complete failure, they are enclosed in some type of moisture proof case. However, the problem of providing such cases is complicated when the electrical device is of such character that a transparent window section is required to permit observation of the instrument scale plate, the transmission of light to the photoelectric cell, or both.

Various cements, waxes, and sealing compounds have been employed to make the joints of an instrument case moisture tight but such materials have not proved entirely satisfactory as, in time, they become brittle and crack or the joint separates under the mechanical shocks which the device encounters in normal use. Also, the gaskets which are employed in conjunction with the glass viewing apertures deteriorate rather rapidly. From one or both of these causes the moisture tight character of the instrument case has not been permanent.

Certain electrical devices have been molded directly into a mass of a transparent plastic material but such constructions have only a limited field of usefulness as the temperature and pressure required for the molding operation cannot be tolerated in many instances. Further, this process cannot be employed when the electrical device is an instrument, such as a voltmeter or an ammeter, having parts which must be free to move.

This invention contemplates a novel manner of constructing an instrument case which is permanently moisture proof and economical to manufacture, and which does not require major changes in the design or construction of the cases now employed to house electrical devices. A case made in accordance with this invention comprises a plurality of plastic sections autogenously united together to form moisture proof joints. One or more of the case sections may be made of a transparent plastic, thereby eliminating the need of the usual glass viewing apertures.

An object of this invention is the provision of a multi-sectioned instrument case in which the several sections are autogenously united, whereby the case is made completely and permanently moisture proof. Another object is the provision of an instrument case comprising a base and cover section, the base and cover being intimately bonded together, whereby the case as a whole is made moisture proof. A further object is the provision of an electrical measuring instrument provided with a scale plate and cooperating pointer lying in two planes, and a moisture proof casing enclosing the instrument, one section of the casing being a transparent plastic material through which the pointer indication may be viewed throughout an exceedingly large angle.

A still further object is the provision of a photoelectric cell enclosed in a multiple section, moisture proof case, one section of which is made of a transparent plastic to permit light to enter therethrough and strike the light sensitive surface of the photocell.

These and other objects and advantages will be apparent from the following description when taken with the accompanying drawing. It is to be understood that the drawing is for purposes of illustration and is not to be construed as defining the limits of the invention, reference being had, for this purpose, to the appended claim.

In the drawing wherein like reference characters identify like parts in the several figures:

Fig. 1 is a front view of an embodiment of the invention in which the encased electrical device is a photoelectric cell;

Fig. 2 is a cross sectional view of the same substantially as seen on the plane of line 2—2 of Fig. 1;

Figs. 3 and 4 are sectional views, similar to Fig. 2, illustrating other encased photocells embodying the invention;

Fig. 5 is a side elevation, partly in section, of the Fig. 4 photocell as modified by the addition of prong terminals;

Fig. 6 is a front view of a photoelectric cell and indicating instrument mounted in a single case;

Fig. 7 is a central sectional view of the same as seen on line 7—7 of Fig. 6;

Fig. 8 is a sectional view similar to Fig. 7, illustrating a modified case cover; and Fig. 9 is a cross sectional view of a light measuring instrument including a pointer and scale plate that may be viewed over a large angle.

Referring now to Figs. 1 and 2, which show an encased photocell, the cover portion 10 of the case is made preferably of a clear, transparent plastic material, such as polystyrene or an acrylic resin, so that light rays may pass therethrough and strike the light sensitive surface of the photocell 11 of the current-generating solid disk or barrier layer type. Current generated by the photocell 11 is conducted by upper collector ring contact 12 and the lower resilient contact 13 to the external prongs 14, as is well known in the art. A base 15, also made of a molded plastic but not necessarily transparent, is adapted to be threaded into the cover 10 substantially as shown. The electrode surfaces of the photocell 11 and their points of electrical engagement with the terminal contacts 12, 13 are spaced from the case, and the dimensions of the case sections 10, 15 are so chosen that the photocell and associated contacts will be maintained in operative relationship by the resilient contact 13 when said base 15 is properly seated relative to the cover 10. Further, the base is beveled at its outer edge to form, in conjunction with the inner wall of the cover 10, a substantially V-shaped, circumferential groove for receiving a tacky mixture 16 comprising, in admixture with a solvent, a plastic material of the type from which the base and cover have been formed. The mixture is applied as a dense, fluid or semi-fluid mass which begins to harden upon application and, during the hardening process, the solvent partially dissolves the surfaces of the base and cover sections with which it comes into contact. Upon evaporation of the solvent, the plastic dissolved therein unites with the softened surface of the base and cover so that, in a relatively short time, the base and cover are autogenously joined together. Thus, the finished case has the general characteristics of a unitary, homogeneous structure which is permanently moisture proof.

It is also possible to unite the sections of the casing autogenously merely by applying a proper solvent for the plastic material, and pressing the sections together until the solvent evaporates. However, it is seldom that the two contacting surfaces will lie in intimate contact throughout their entire extent unless maintained under relatively great pressure. To provide such pressure in the formation of instrument cases of the instant type becomes costly in view of the special fixtures and pressures required, and it is therefore preferred to employ the described method in which the sealing is effected by a mixture of plastic dissolved in a suitable solvent. Such a mixture possesses the advantage of dissolving the immediate surfaces to be united and at the same time the interspaces which may exist between the surfaces are filled up with the plastic as the solvent evaporates. The resulting joint is homogeneous and solid.

The transparent plastic covers of instruments which are subject to excessive handling or rough usage may be scratched at the window surfaces as the molded plastic materials are relatively soft. This possible objection is eliminated by the embodiment, illustrated in Fig. 3, in which a glass disc 17 overlies, and is molded into or cemented to, the outer end of the casing section 10'. The glass disc protects the transparent portion of the cover without affecting the moisture proof character of the case as a whole. Further, the glass disc 17 may be suitably tinted to constitute a light filter to provide a photocell having a desired spectral response, as is well known in the art. Alternatively, a filter effect may be achieved by forming the case cover of a suitably tinted or colored plastic material.

A photoelectric cell case made in two sections and hermetically sealed in accordance with this invention, offers considerable latitude in the construction of the completed unit. A photocell of simplified construction adapted to various types of mounting is illustrated in Figs. 4 and 5. The case comprises a cover 18 formed of a transparent plastic material and a base 19 also of plastic material, but not necessarily transparent, the cover and base being autogenously united as explained hereinabove. A current collector ring 12' establishes contact with the front surface of the photocell disc 11 and is electrically insulated from other portions of the disc by an insulating washer or ring 20. The assembly of the photocell disc 11, contact ring 12' and insulator 20 is retained in operative position under the pressure exerted by the raised inner section of the base 19 when the base is in proper position. Threaded terminals 21 are molded into base 20 and reinforced by the nuts 22, 23 at the inner and outer faces, respectively, of the base. Internal electrical connections to the terminals 21 are provided by the usual soldered jumper connections or, as shown, by coiled springs 24 seated within bores in the ends of the respective terminals 21 and establishing pressure contacts against the inturned portion of the contact ring 12' and against the back of photocell disc 11.

It is often desirable to mount a photocell into a common radio tube socket to facilitate replacement, and units designed for such mounting are provided with prong connectors of the type illustrated in Fig. 1. The photocell shown in Fig. 4 may be provided with an adapter for this purpose, as shown in Fig. 5. The adapter terminals 25, 26 of different diameters have apertured inner ends that are fitted over and rigidly secured to terminals 21 by nuts 27. A domed cover 28 is preferably fitted over the adapter terminals, and held in position by nuts 29, to improve the general appearance of the completed unit.

Hermetically sealed cases, made according to this invention may be advantageously employed to house electrical instruments which require relative movement of various members for operation. By way of example, such an instrument, namely an illumination meter, is shown in Figs. 6–8. It comprises a photocell 11 which, under the action of light, actuates the movable coil 30 of a permanent magnet, movable coil type instrument. The deflection of instrument pointer 31 with respect to a suitably calibrated scale 32 is a measure of the light striking the surface of the photocell. Both the photocell and the instrument are housed in a single case comprising a transparent plastic cover 33 and a plastic base 34. The base 34 has a beveled edge which forms a peripheral groove along the side wall of the cover 33, this groove being filled with the plastic mixture 35 to join the base and cover, as explained hereinabove. When sealing up a relatively large chamber, temperature changes or a slight alteration in the relative disposition of the base or cover may cause the air within the chamber to expand or contract. Such "breathing" during the time that the plastic mixture is hardening may result in an imperfect seal and, to eliminate this possibility, the base 34 is provided with a small hole 36 which permits ready transfer of the air while the base and cover sections are being permanently united. Once this has been accomplished, the tiny hole may be sealed by applying a drop 37 of the plastic mixture.

To prevent possible scratching of the operative section of the plastic case cover, the cover may be modified, as shown in Fig. 8, to include a protecting glass plate 38 over the top surface of the cover section 33'.

When the cover section of the instrument case is made of a transparent plastic material, the internal mechanism of the instrument may be modified, as shown in Fig. 9, with reference to an illumination meter, so as to greatly increase the angle from which the observer's eye may view the pointer deflection. The cover 39 and the base 40 are made of transparent plastic material and are joined together by an autogenous bond, as described above. The light to be measured passes through the transparent base and strikes the photocell 11 which is connected to movable coil 41 of the measuring instrument. A pointer 42 is affixed to the coil 41 and cooperates with a suitably calibrated scale plate 43. The outer end of the pointer is bent downwardly at substantially a right angle, as shown, and the scale plate 43 has both a radial and a cylindrical surface. It will be apparent that the calibration markings may be formed on both portions of the plate 43, and that the position of the pointer relative to said calibrations may then be observed from either a vertical or horizontal position.

Portions of a transparent casing member may be rendered opaque, if desired, by spraying an enamel upon the sections through which there is to be no transmission of light. The hermetically sealed casings may be opened for repair or replacement of the electrical devices by cutting out the sealing section of the casings with a milling cutter of conical or other appropriate form.

Having now described various embodiments of my invention, it will be apparent that other variations and modifications are permissible without departing from the spirit and scope of the invention, as set forth in the claim.

I claim:

An encased electrical device comprising a measuring instrument having a pivotally mounted coil carrying a pointer, a scale plate and a photocell of the disk type, such parts of the instrument being mounted wholly within the confines of an integral hollow substantially concave casing, portions of said casing being transparent, said portions being in the bottom wall of said casing, said scale plate being mounted adjacent and facing one of such portions and said photocell being mounted adjacent and facing another of such portions, said casing being sealed by means of a cover, said cover being of the same material as said casing and being autogenously secured to said casing by means of a mass of plastic material of substantially the same chemical composition as said casing and cover, said mass extending along the flat contacting faces of said casing and cover, said transparent portions being disposed in side by side relationship whereby the effort exerted upon one side of the photocell is readable upon the scale, from the same side of the photocell.

ANTHONY H. LAMB.